United States Patent
Dallal et al.

(10) Patent No.: US 12,256,420 B2
(45) Date of Patent: Mar. 18, 2025

(54) ZERO POWER SLOTS FOR RX ESTIMATION AND ANALOG FREQUENCY DEPENDENCE REPORT

(71) Applicant: QUALCOMM Incorporated, San Diego, CA (US)

(72) Inventors: Yehonatan Dallal, Kfar Saba (IL); Idan Michael Horn, Hod Hasharon (IL); Shay Landis, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 17/661,977

(22) Filed: May 4, 2022

(65) Prior Publication Data

US 2023/0362971 A1    Nov. 9, 2023

(51) Int. Cl.
*H04W 56/00*      (2009.01)
*H04W 72/23*      (2023.01)
*H04W 72/542*     (2023.01)

(52) U.S. Cl.
CPC ......... *H04W 72/542* (2023.01); *H04W 72/23* (2023.01)

(58) Field of Classification Search
CPC ............................ H04W 72/542; H04W 72/23
USPC ........................................................ 370/252
See application file for complete search history.

(56) References Cited

U.S. PATENT DOCUMENTS

| | | | |
|---|---|---|---|
| 2009/0268630 A1 | 10/2009 | Yellin et al. | |
| 2015/0365165 A1* | 12/2015 | Rasmussen | H04B 10/07953 398/26 |
| 2023/0142092 A1* | 5/2023 | Jiang | H04J 14/0227 398/68 |

FOREIGN PATENT DOCUMENTS

| | | |
|---|---|---|
| EP | 4192091 A1 | 6/2023 |
| WO | 2021244374 A1 | 12/2021 |

OTHER PUBLICATIONS

"Zhang et al., Method and Device For Setting the Subband CSI Related Parameter of, Jun. 14, 2019, CN 109891811" (Year: 2017).*
International Search Report and Written Opinion—PCT/US2023/020459—ISA/EPO—Aug. 14, 2023.

* cited by examiner

*Primary Examiner* — Sai Ming Chan
(74) *Attorney, Agent, or Firm* — QUALCOMM Incorporated

(57) ABSTRACT

This disclosure provides systems, devices, apparatus, and methods, including computer programs encoded on storage media, for measurement and reporting techniques based on zero power slots. A UE may receive an allocation of one or more ZP slots from a network entity. The one or more ZP slots may correspond to one or more transmission gaps associated with the network entity. The UE may detect noise energy in the one or more ZP slots corresponding to the one or more transmission gaps associated with the network entity and measure the noise energy detected in the one or more ZP slots. The measured noise energy in the one or more ZP slots may correspond to a frequency dependence of an Rx signal at the UE.

27 Claims, 12 Drawing Sheets

ZERO POWER SLOTS FOR RX ESTIMATION AND ANALOG FREQUENCY DEPENDENCE REPORT

TECHNICAL FIELD

The present disclosure relates generally to communication systems, and more particularly, to measurement and reporting techniques based on zero power slots.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive an allocation of one or more zero power (ZP) slots from a network entity, the one or more ZP slots corresponding to one or more transmission gaps associated with the network entity; detect noise energy in the one or more ZP slots corresponding to the one or more transmission gaps associated with the network entity; and measure the noise energy detected in the one or more ZP slots, the measured noise energy in the one or more ZP slots corresponding to a frequency dependence of a receive (Rx) signal at a user equipment (UE).

In another aspect of the disclosure, a method, a computer-readable medium, and an apparatus are provided. The apparatus may transmit an allocation of one or more ZP slots to at least one UE, the one or more ZP slots corresponding to one or more transmission gaps associated with the network entity; and receive a report of a first measurement that corresponds to a frequency dependence of an Rx signal at the at least one UE and a second measurement that corresponds to a combined frequency dependence of a transmit (Tx) signal of the network entity and the Rx signal at the at least one UE, the first measurement associated with noise energy in the one or more ZP slots corresponding to the one or more transmission gaps associated with the network entity.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
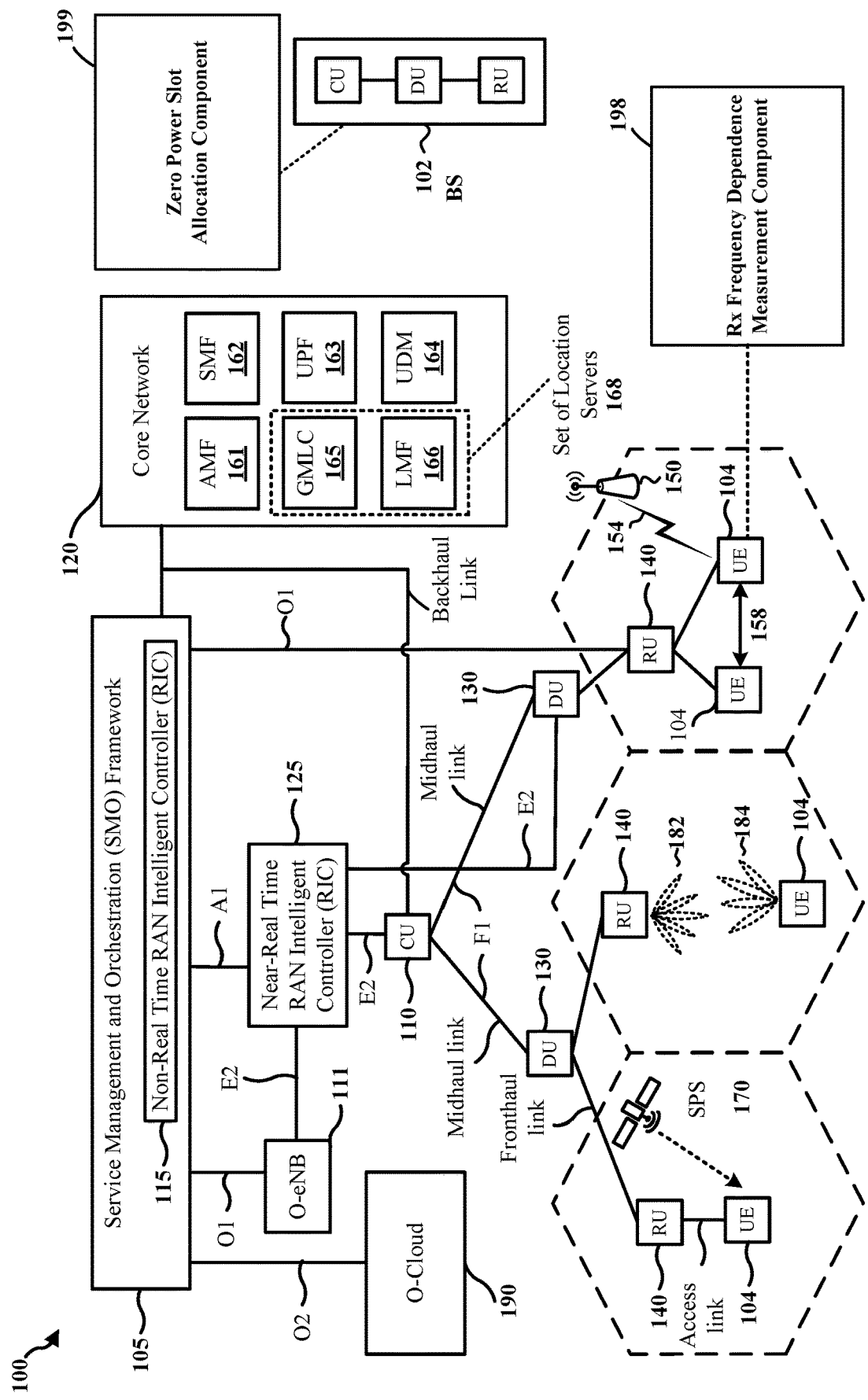
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective user equipments (UEs) 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a receive (Rx) frequency dependence measurement component 198 configured to receive an allocation of one or more zero power slots from a network entity, the one or more zero power (ZP) slots corresponding to one or more transmission gaps associated with the network entity; detect noise energy in the one or more ZP slots corresponding to the one or more transmission gaps associated with the network entity; and measure the noise energy detected in the one or more ZP slots, the measured noise energy in the one or more ZP slots corresponding to a frequency dependence of an Rx signal at the UE. In certain aspects, the base station 102 or a network entity of the base station 102 may include a zero power slot allocation component 199 configured to transmit an allocation of one or more ZP slots to at least one UE, the one or more ZP slots corresponding to one or more transmission gaps associated with the network entity; and receive a report of a first measurement that corresponds to a frequency dependence of an Rx signal at the at least one UE and a second measurement that corresponds to a combined frequency dependence of a transmit (Tx) signal of the network entity and the Rx signal at the at least one UE, the first measurement associated with noise energy in the one or more ZP slots corresponding to the one or more transmission gaps associated with the network entity. Although the following description may be focused on 5G NR, the concepts described herein may be applicable to other similar areas, such as LTE, LTE-A, CDMA, GSM, and other wireless technologies.

Figure 2:
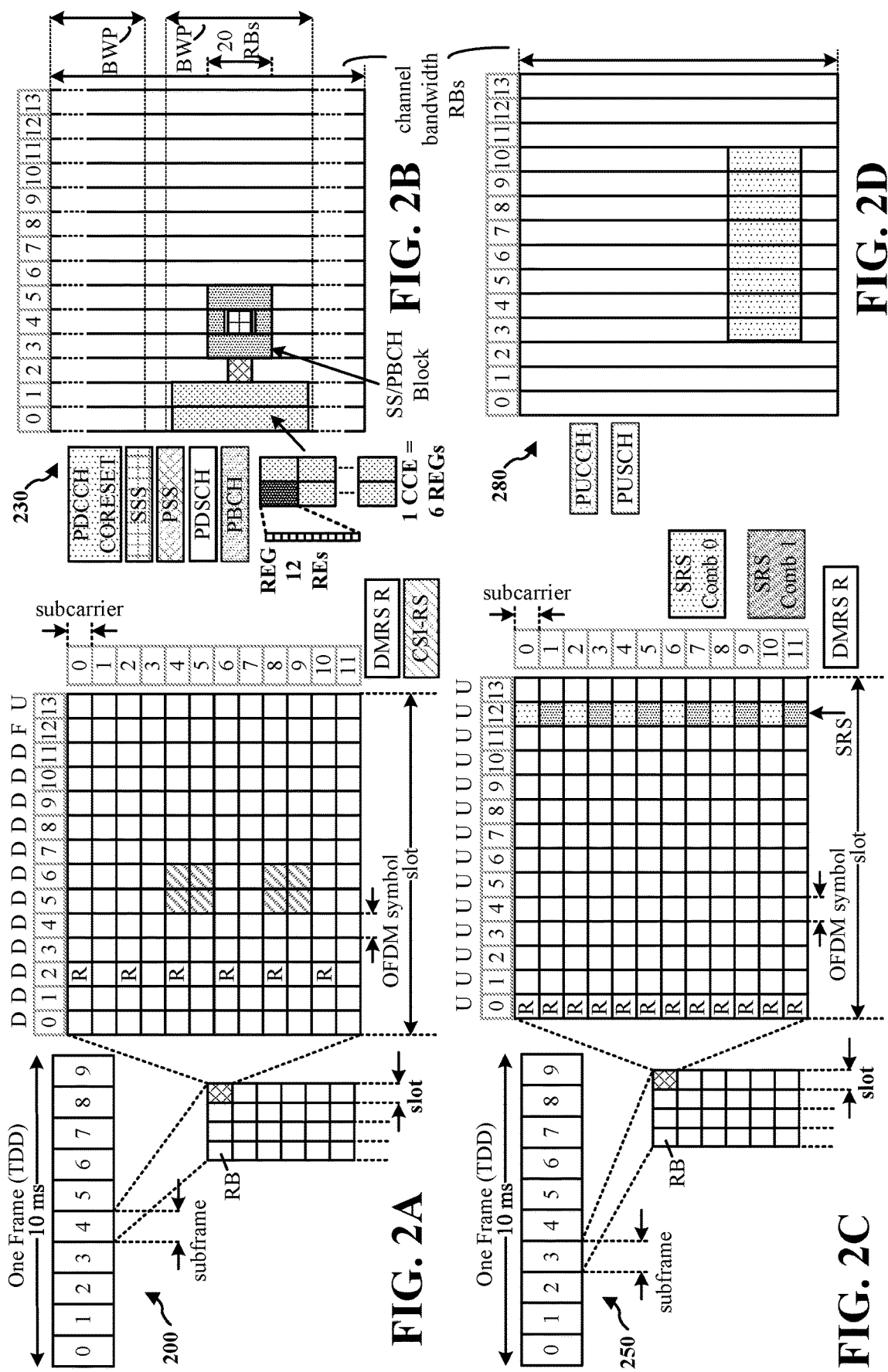
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
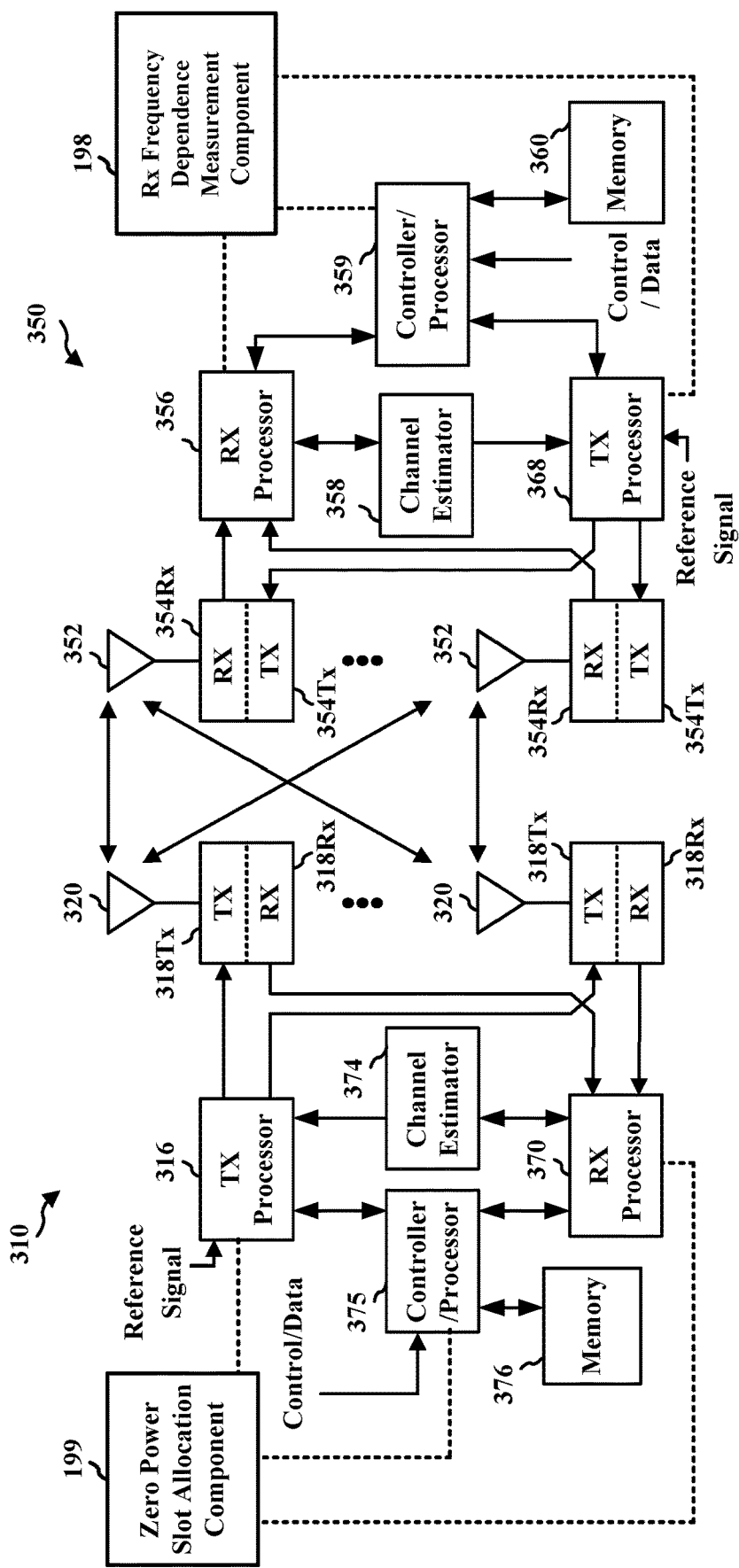
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting;

PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the Rx frequency dependence measurement component 198 of FIG. 1.

At least one of the TX processor 316, the RX processor 370, and the controller/processor 375 may be configured to perform aspects in connection with the zero power slot allocation component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
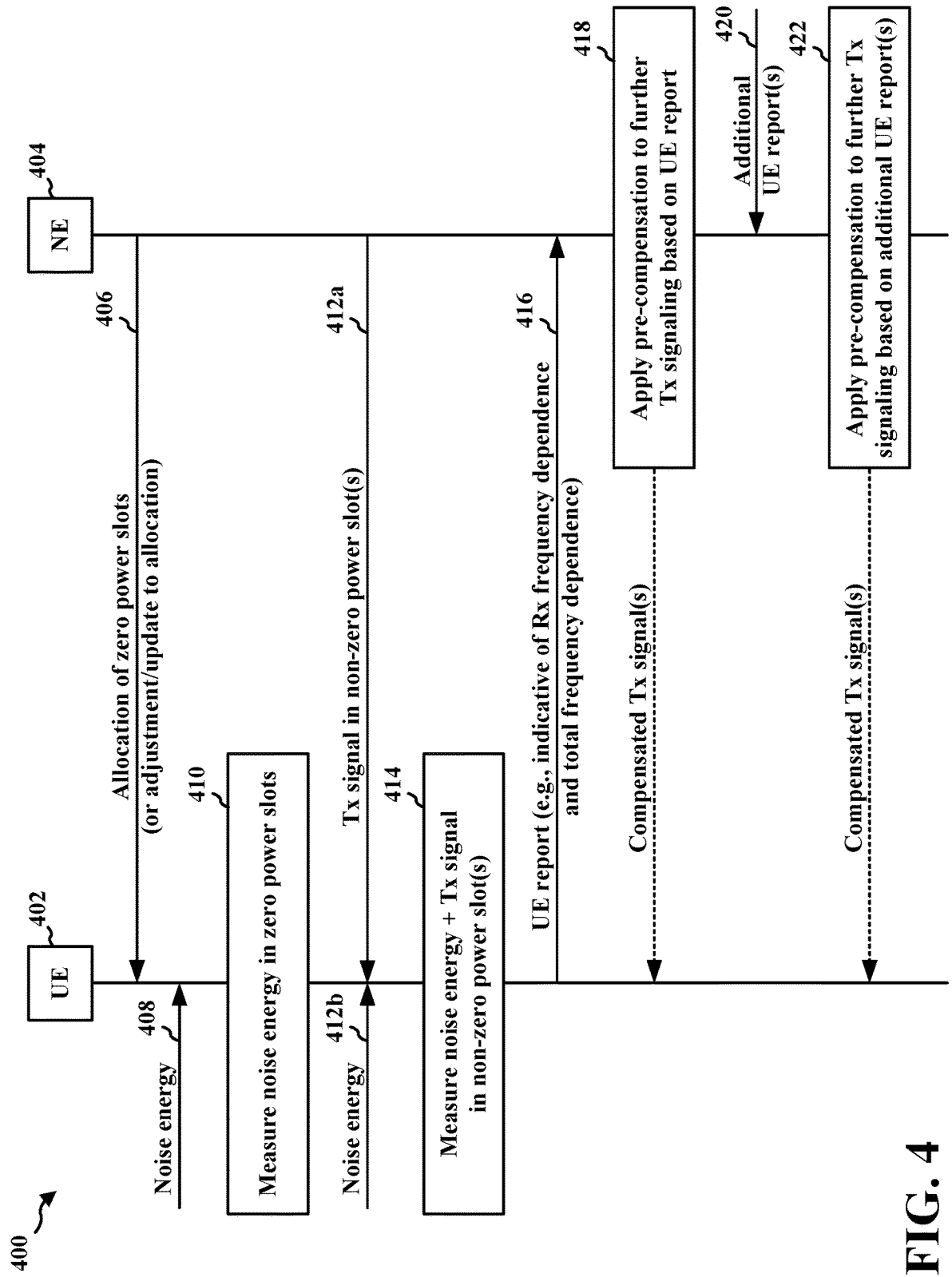
FIG. 4 is a call flow diagram illustrating communications between a UE and a network entity.

FIG. 4 is a call flow diagram 400 illustrating communications between a UE 402 and a network entity 404. The network entity 404 may correspond to a base station or an entity at a base station, such as a CU, a DU, an RU, etc. At 406, the network entity 404 may transmit an allocation of zero power slots to one or more UEs, such as the UE 402. The allocation transmitted, at 406, may be a network-wide allocation of zero power slots for the one or more UEs associated with the network entity 404. In examples, the allocation transmitted, at 406, may correspond to an adjustment/update to a previous allocation of zero power slots by the network entity 404.

"Zero power slot" refers to a slot where a transmitter, such as the network entity 404, does not transmit signaling (e.g., silent slot). For example, a zero power slot may correspond to a slot where the network indicates that no transmissions will be performed by network entities operating in associated frequency bands, which may allow for measurements to be performed of the background noise. A full silent slot may be used for background noise measurements, since the noise energy may be low and an averaging techniques may be performed to more accurately measure the noise energy and the associated frequency dependence. Thus, noise energy (e.g., generated at a receiver, such as the UE 402) may be detected during time intervals of the zero power slots without detection of transmitter signaling. For example, the UE 402 may detect noise energy, at 408, during the zero power slots allocated, at 406. The noise energy may be generated, in some cases, at a low-noise amplifier (LNA) of the UE 402. The UE 402 may measure, at 410, the noise energy in the zero power slots (e.g., free of signaling from the network entity 404) to determine an Rx frequency dependence at the UE 402 based on the measured noise energy.

The network entity 404 may transmit, at 412a, Tx signaling to the UE 402 in a non-zero power slot(s), such that the UE 402 may determine a total frequency dependence of received signaling based on a combination of the noise energy detected, at 412b, together with the Tx signaling received, at 412a, from the network entity 404 in the non-zero power slot(s). For example, the UE 402 may measure, at 414, the noise energy together with the Tx signaling in the non-zero power slot(s).

At 416, the UE 402 may transmit a UE report to the network entity 404. The UE report may be indicative of the measurements performed, at 410 and 414, by the UE 402. For example, the UE report may be indicative of an Rx frequency dependence determined based on the measurement performed, at 410, of the noise energy in the zero power slots and indicative of a total frequency dependence based on the noise energy measured, at 414, together with the Tx signaling in the non-zero power slot(s). The Tx frequency dependence may be determined by the network entity 404 and/or the UE 402 based on subtracting the Rx frequency dependence indicated in the UE report from the total frequency dependence also indicated in the UE report.

At 418, the network entity 404 may apply a pre-compensation to further Tx signaling based on the UE report received, at 416, from the UE 402. For example, the network entity 404 may transmit compensated Tx signal(s) to the UE 402. In some configurations, the network entity 404 may receive, at 420, additional UE report(s) from one or more additional UEs. At 422, the network entity 404 may apply the pre-compensation to the further Tx signaling based on the additional UE report(s) received, at 420, from the one or more additional UEs. Thus, the network entity 404 may transmit compensated Tx signal(s) to the UE 402 based on a federated UE reporting approach.

Figure 5:
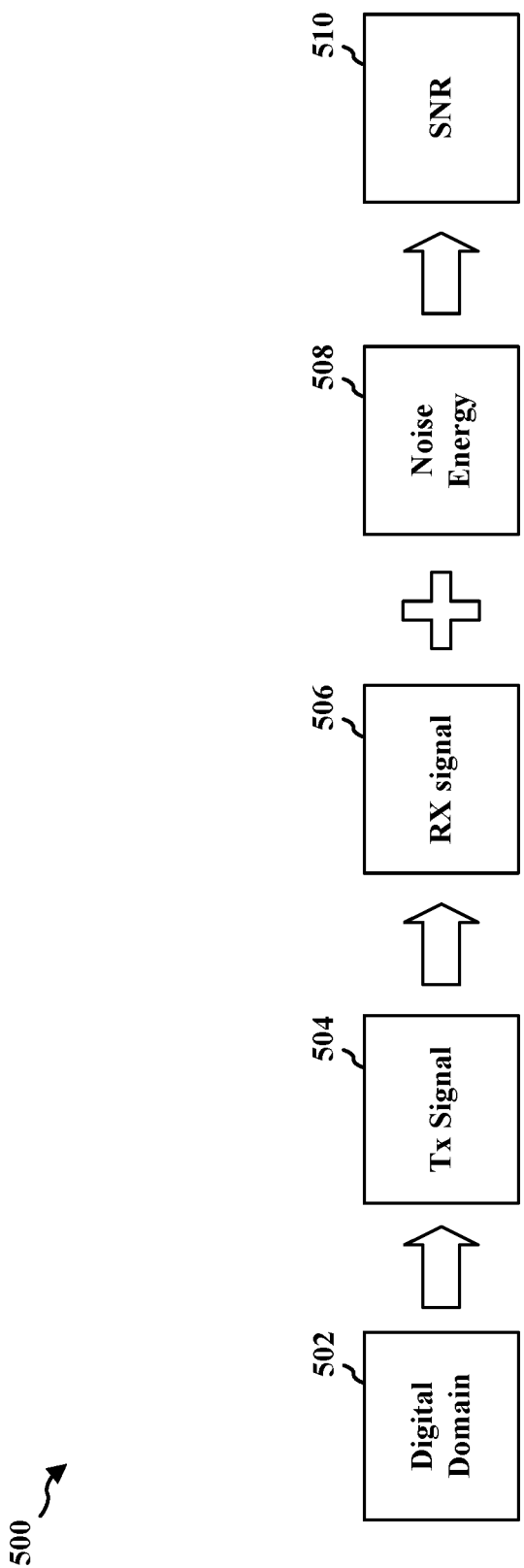
FIG. 5 illustrates a diagram indicative of transmit (Tx)/receive (Rx) frequency dependence.

FIG. 5 illustrates a diagram 500 indicative of Tx/Rx frequency dependence. "Frequency dependence" refers to a rate at which an amplitude of a signal pulse decays. For example, the frequency dependence may correspond to a difference at a top/amplitude of the signal pulse between a start of the top/amplitude of the signal pulse and an end of the top/amplitude of the signal pulse. A ripple at the top/amplitude of the signal pulse may be associated with the frequency dependence. The frequency dependence may be used to characterize aspects of analog Tx/Rx chains associated with a filter.

Degradations in radio frequency integrated circuits (RFICs) used for wireless communication may be difficult for UEs and other network entities to measure. For example, the Tx frequency dependence and the Rx frequency dependence may not be separable in some cases based on certain techniques. While a total frequency dependence of an overall signal may be measured by the UE to determine the frequency dependence associated with a link between the UE and the base station, the UE may not be able to separately determine, from the total frequency dependence, a first portion of the total frequency dependence associated with a Tx signal 504 and a second portion of the total frequency dependence associated with an Rx signal 506. For instance, the UE may estimate the channel based on an overall signal that includes a relatively flat top/amplitude, but the UE may be unable to separately estimate the contributions of the Tx signal 504 and the Rx signal 506 on the overall signal.

Degradations, such as filter droop, may be based on different aspects at the Tx signal 504 and the Rx signal 506. Both Tx degradations and Rx degradations may impact the overall signal communicated between the base station and the UE. Thus, if the UE is configured to separate the Tx characteristics from the Rx characteristics that contribute to the total frequency dependence of the overall signal, the UE may indicate the Tx characteristics/Tx frequency dependence to the base station, so that the base station may perform a pre-compensation technique for the Tx frequency dependence on subsequently transmitted signals. Zero power slots may be used by the UE to isolate, measure, and/or determine the Rx frequency dependence, which may be subtracted from a total signal frequency dependence measured at the Rx side to determine the Tx frequency dependence and provide a separation of variables for corrections/adjustments to the Tx signal 504.

In a first aspect, the combined signal communicated between the base station and the UE may include Tx frequency dependence without significant Rx frequency dependence (e.g., no Rx frequency dependence). The signal may be generated in a digital domain 502, but may be converted to an along domain for transmission of the Tx signal 504 by a transmitter, such as a transmitter associated with a base station. The Tx signal 504 may be received by a receiver, such as a receiver of the UE, and may include analog signal frequency dependence. The analog signal frequency dependence may correspond to a pattern/shape that one or more RF filters may have imprinted on the Tx/Rx signals 504-506. The UE may receive the transmitted signal via the receiver as an Rx signal 506 along with a certain amount of noise energy 508 (e.g., flat noise) that may be added to the Rx signal 506 to include the overall signal. Hence, the Rx signal 506 received at the UE may include a certain signal-to-noise (SNR) 510, which may impact the edges of the signal and may be referred to as signal "droop". For example, the edges of the signal may be lower as a result of the SNR 510. The signal droop may cause a range of the signal to be reduced and may be based on characteristics of a Tx beam.

In a second aspect, the combined signal communicated between the base station and the UE may include Rx frequency dependence without significant Tx frequency dependence (e.g., no Tx frequency dependence). For instance, Tx circuits at the base station may be calibrated, such that little or no Tx frequency dependence is included in the Tx signal 504. The signal may be generated in the digital domain 502, but may be converted to the along domain for transmission of the Tx signal 504 by a transmitter, such as a transmitter associated with the base station. The generated signal may be passed through one or more analog filters prior to transmission of the Tx signal 504 by the transmitter, where the Tx signal 504 may not include a resulting Tx frequency dependence from the one or more analog filters at the base station. However, the noise energy 508 added to the Rx signal 506 at the receiver, such as a receiver of the UE, may generate Rx frequency dependence/signal droop at the UE.

The noise energy 508 generated at the receiver may pass through the same Rx circuit that the Rx signal 506 is passed through. Thus, characteristics of the noise energy 508 may be impacted by the Rx circuit in a same way that characteristics of the Rx signal 506 is impacted by the Rx circuits. As such, the SNR 510 may not be impacted by characteristics of the Rx circuit (e.g., flat SNR). The noise energy 508 may be reduced and attenuated at the edges of the overall signal in the same way that the Rx signal 506 is attenuated. That is, the Rx signal 506 may be replicated based on increasing a gain of the noise energy 508 and may include a same SNR 510, which may again have a reduced range based on the Rx frequency dependence/signal droop.

In a third aspect, the combined signal communicated between the base station and the UE may include a combined frequency dependence (e.g., Tx frequency dependence and Rx frequency dependence). That is, the combined signal received at the receiver may include both a Tx frequency dependence generated via the transmitter and an Rx frequency dependence generated via the receiver. The signal may be generated at the Tx side of the communication in the digital domain 502, but may be converted to the along domain for transmission of the Tx signal 504 by the transmitter. The transmitted signal may be received as an Rx signal 506 at a receiver, along with generated noise energy 508, before being passed through the Rx circuit at the Rx side of the communication. The noise energy 508 may be added to the Rx signal 506 at the Rx side of the communication. Hence, the frequency dependence generated by the noise may not originate at the Tx side of the communication. In an example, the frequency dependence associated with the noise may correspond to one-quarter of the total signal frequency dependence. The SNR 510 may be the same SNR 510 as associated with the Tx frequency dependence. A reduced range of the signal may be based on one or more Tx beams. The UE may have to separate the noise energy 508 from the combined signal in order to determine/estimate the Tx frequency dependence of the Tx signal 504.

Figure 6:
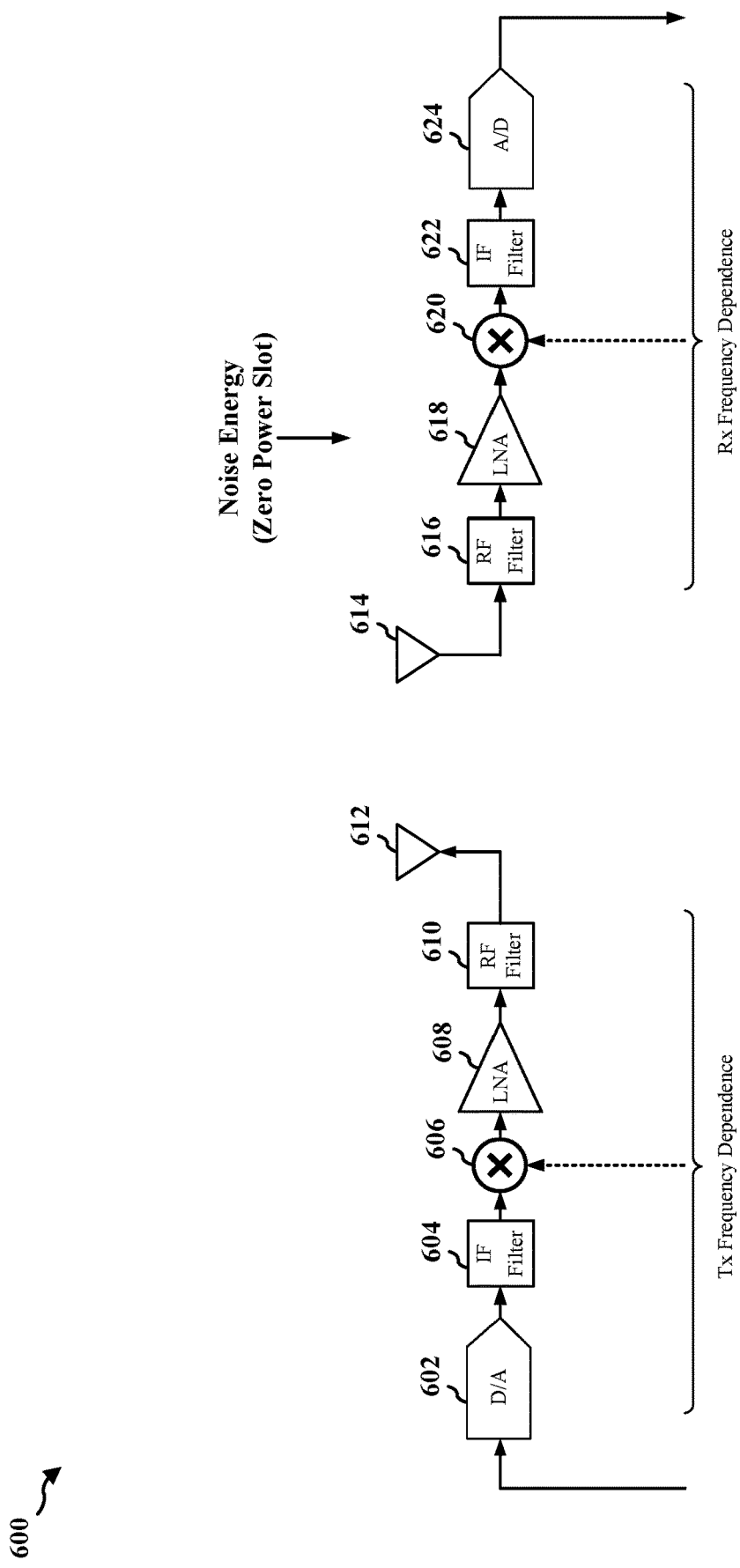
FIG. 6 illustrates a diagram of Tx/Rx analog circuits.

FIG. 6 illustrates a diagram 600 of Tx/Rx analog circuits. A signal may be generated at a Tx device in the digital domain and input to a digital-to-analog converter 602. An output of the digital-to-analog converter 602 may not be identical to the input of the digital-to-analog converter 602 characterized in the digital domain. For instance, the output in the analog domain may include a shape to the signal that was not part of the input signal in the digital domain. The shape may be imprinted on the signal that is output from the digital-to-analog converter 602. The output may be received by an intermediate frequency (IF) filter 604, which may be configured to apply a compensation to the shape of the output analog signal.

The compensated signal may be received by a mixer 606, which may have an output/response to the compensated signal that is not flat at the top/amplitude of the signal. For example, the signal may loosely resemble a square wave, where the top/amplitude of the signal may include a ripple, rather than being flat. The shape of the ripple may be based on a bandwidth associated with the mixer 606. The output/response of the mixer 606 may be passed through a diode, such as an LNA 608, and provided to an RF filter 610, which may further provide the signal to a Tx antenna 612 that transmits the signal. The Tx frequency dependence may be included in the transmitted signal, as the ripple may be imprinted on the signal provided to the Tx antenna 612.

The signal transmitted from the Tx device may be received at an Rx antenna 614 of an Rx device, which may determine a frequency dependence of an overall signal at the Rx device. The overall frequency dependence of the signal may include the Tx frequency dependence plus the Rx frequency dependence caused by noise energy. In some examples, the Rx device may determine the Rx frequency dependence based on a zero power slot. Zero power slots are slots where Tx devices do not transmit signaling. Thus, signals received at the Rx antenna 614 of the Rx device during zero power slots may correspond to noise energy generated at the Rx device, such as at an LNA 618. Rx chain amplification may be adjusted to a highest level of the amplifier for determining the noise frequency dependence at the Rx device.

Signaling received by the Rx antenna 614 of the Rx device may be provided to an RF filter 616. In cases where the received signal corresponds to noise energy plus the transmitted signal from the Tx device, the RF filter 616 may be used to remove characteristics associated with noise energy. The received signal may be provided from the RF filter 616 to a diode, such as the LNA 618, which may further provide the received signal to a mixer 620. The mixer 620 at the Rx device may have an output/response to the received signal that is not flat at the top/amplitude of the received signal. For instance, the output/response may loosely resemble a square wave, where the top/amplitude of the output/response may include a ripple. An IF filter 622 that receives the output/response of the mixer 620 may apply a compensation to a shape of the ripple, but the Rx frequency dependence may still be imprinted on an input to an analog-to-digital converter 624.

If the UE is unable to determine a combined shape associated with the Tx frequency dependence and the Rx frequency dependence, compensation techniques may result in overcompensation of the received signal. However, if the Rx frequency dependence is compensated in cases without the Tx frequency dependence, overcompensation may not occur, as the SNR may not be impacted by the shape associated with the Rx frequency dependence. Instead, the SNR may be impacted based on the shape associated with the Tx frequency dependence, which may be included in the combined signal/combined frequency dependence of the received signal. In order to determine the shape associated with the Tx frequency dependence, the UE may be configured to separate the combined signal into a Tx portion and an Rx portion.

When the Tx device is not transmitting a signal, energy received at the Rx antenna 614 of the Rx device may correspond to noise energy. Thus, an output of the Rx device in the digital domain from the analog-to-digital converter 624 may correspond to the noise energy without the addition of Tx signaling. The shape imprinted on the noise energy by the Rx circuit at the Rx device would be a same shape imprinted on a signal received from the transmitter. Thus, the Rx device may measure characteristics of the noise energy to determine a shape of the Rx frequency dependence caused by the RF filter 616, the mixer 620, power amplifiers, etc. The Rx frequency dependence may be subtracted from the combined frequency dependence to determine the Tx frequency dependence. The Rx device may indicate/report the determined Tx frequency dependence to the Tx device, such that the Tx device may compensate for the Tx frequency dependence in further Tx signaling.

A base station may allocate one or more zero power slots to a UE, such that the UE may determine slots in which the base station is not transmitting. The zero power slots may correspond to a network-wide allocation of zero power slots (e.g., silent slots) over the whole network at a same time. One or more slots may be used to provide a threshold amount of time for averaging the noise energy and/or to accumulate enough noise energy to determine the shape of the analog frequency dependence. Hence, information may be collected and recorded over a plurality of slots in order to determine the analog frequency dependence.

Noise measurement and averaging may be performed on an Rx chain. Based on the information collected over the plurality of slots, the UE may determine the shape that filters, such as the RF filter 616 and/or the IF filter 622, have on the received signal (e.g., based on different gain settings and/or different beams). Estimation techniques for the Rx frequency dependence may not be based on a calibration at the Rx device, as some noise characteristics may change based on external factors, such as temperature, time, device aging, etc. Thus, the UE may have to measure the Rx frequency dependence from time-to-time in order to isolate the Tx frequency dependence from the combined signal, which may include the Rx signal plus the noise energy. The UE may indicate the determined Tx frequency dependence to the base station, such that the base station may apply a pre-compensate technique to further Tx signaling. In order to subtract the Rx frequency dependence from the combined signal, the UE may also have to perform a measurement on the combined signal/combined frequency dependence, either before or after determining the Rx frequency dependence via a zero power slot.

Zero power slots may be used for Rx radio calibration and characterization of the signal received at the Rx antenna 614. The zero power slots may be periodic, aperiodic, or semi-persistent. The number of zero power slots may be adjusted for certain procedures, or the zero power slots may correspond to particular slot pattern determined at the UE. For example, the slot pattern may correspond to 1 zero power slot/silent slot for every 100 non-zero power slots. The whole zero power slot may be dedicated as a silent slot. Zero power slots may be associated with similar characteristics to zero power REs/RBs, zero power CSI-RS, etc., that may be used to estimate aspects, such as interference in a cell. However, zero power slots may be different from such aspects in that complete slots may be configured as silent slots across a whole network or area. Thus, zero power slot locations may have to be defined at the core network. Zero power slots may allow averaging and measurement of noise to be performed based on a lack of Tx signaling in the slots across the network, and may also allow for separation of the Tx frequency dependence and the Rx frequency dependence from a combined signal for applying a pre-compensation to further Tx signaling at the Tx device.

An Rx device, such as a UE may indicate, to the Tx device, such as a base station, the Tx frequency dependence determined at the Rx device. The Tx device may compensate for the Tx frequency dependence in further Tx signaling based on the indication received from the Rx device. The Tx frequency dependence may be indicated to the base station (e.g., Tx device) in a UE report from the UE (e.g., Rx device). The UE report may be indicative of measurements performed by the UE in the zero power slots, such as Rx frequency dependence measurements, and/or measurements performed by the UE in non-zero power slots, such as combined signal frequency dependence measurements performed on the Rx signal and the noise energy detected together at the UE.

The Tx frequency dependence may be pre-compensated at the Tx device based on information received from the Rx device. The frequency dependence of the signal may be beam dependent at both the Tx side and the Rx side of the communication link. That is, different beam characteristics may be generated based on different combinations of analog chains. The UE may report the Rx frequency dependence to the base station together with the combined frequency dependence of the signal, where the Tx frequency dependence may be determined based on subtraction of the Rx frequency dependence from the combined frequency dependence of the signal. The base station may store UE frequency dependence reports from a plurality of UEs based on a federated approach to estimate the Tx frequency dependence at the base station. After the Tx frequency dependence is determined by the base station based on one or more UE frequency dependence reports received from one or more UEs, the base station may apply a compensation for the Tx frequency dependence to transmitted signaling.

UE frequency dependence reports indicative of the combined frequency dependence of the signal, the Rx frequency dependence, the Tx frequency dependence, etc., may be indicative of common RF degradations based on federated reporting techniques associated with a plurality of UEs. The base station may use the federated UE frequency dependence reports to determine the Tx frequency dependence of the base station and compensate for the Tx frequency dependence in further transmissions of the base station. Federate reporting procedures may increase a reliability of Tx frequency dependence determinations at the base station, as a single UE report may include one or more inaccuracies that may be corrected based on federated UE reporting approaches. UE frequency dependence reporting may allow for real-time tracking of Tx frequency dependence at the base station, such that a performance of the base station may be improved based on pre-compensations for the Tx frequency dependence.

Figure 7:
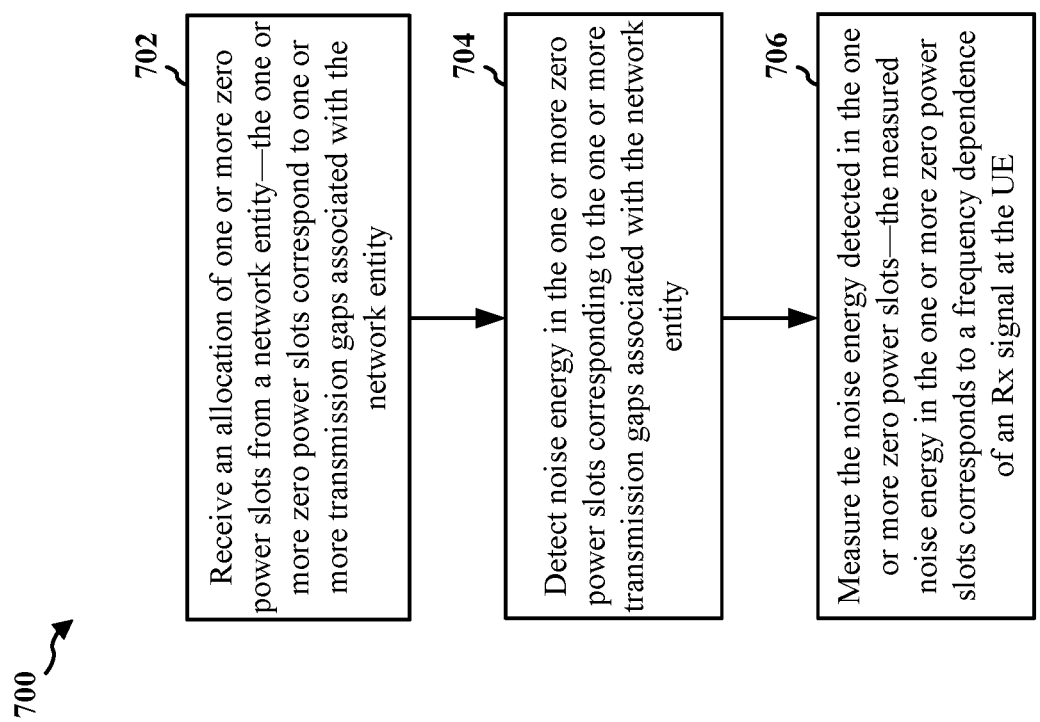
FIG. 7 is a flowchart of a method of wireless communication at a UE.

FIG. 7 is a flowchart 700 of a method of wireless communication. The method may be performed by a UE (e.g., the UE 104, 350, 402, the apparatus 1104, etc.), which may include the memory 360 and which may correspond to the entire UE 104, 350, 402 or apparatus 1104, or a component of the UE 104, 350, 402 or the apparatus 1104, such as the TX processor 368, the RX processor 356, the controller/processor 359, the cellular baseband processor 1124, and/or the application processor 1106.

At 702, the UE may receive an allocation of one or more zero power slots from a network entity—the one or more zero power slots correspond to one or more transmission gaps associated with the network entity. For example, referring to FIG. 4, the UE 402 may receive, at 406, an allocation of zero power slots from the network entity 404. "Transmission gap" refers to a period of signaling/transmission inactivity of a transmitter between a completion of a previous transmission and a start of a next transmission. The reception, at 702, may be performed by the Rx frequency dependence measurement component 198 of the apparatus 1104 in FIG. 11.

At 704, the UE may detect noise energy in the one or more zero power slots corresponding to the one or more transmission gaps associated with the network entity. For example, referring to FIGS. 4-6, the UE 402 may detect, at 408, noise energy 508 based on the allocation, at 406, of the zero power slots. For example, the UE may detect the noise energy 508 at the LNA 608 in one or more zero power slots. The detection, at 704, may be performed by the Rx frequency dependence measurement component 198 of the apparatus 1104 in FIG. 11.

At 706, the UE may measure the noise energy detected in the one or more zero power slots—the measured noise energy in the one or more zero power slots corresponds to a frequency dependence of an Rx signal at the UE. For example, referring to FIG. 4, the UE 402 may measure, at 410, the noise energy in the zero power slots. A measurement of the noise energy 508 may be indicative of an Rx frequency dependence associated with the Rx signal 506. The measurement, at 706, may be performed by the Rx frequency dependence measurement component 198 of the apparatus 1104 in FIG. 11.

Figure 8:
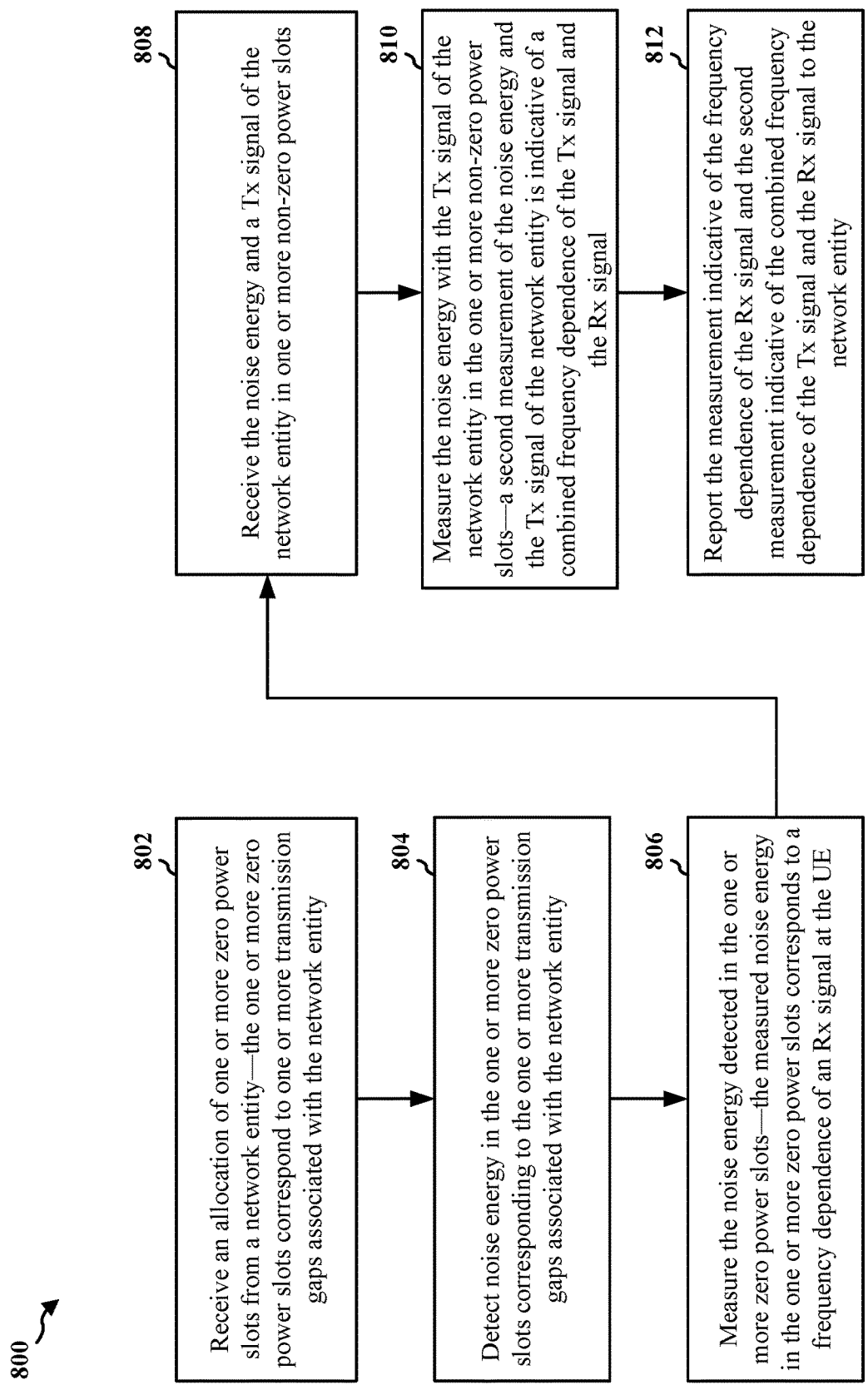
FIG. 8 is a flowchart of a method of wireless communication at a UE.

FIG. 8 is a flowchart 800 of a method of wireless communication. The method may be performed by a UE (e.g., the UE 104, 350, 402, the apparatus 1104, etc.), which may include the memory 360 and which may correspond to the entire UE 104, 350, 402 or apparatus 1104, or a component of the UE 104, 350, 402 or the apparatus 1104, such as the TX processor 368, the RX processor 356, the controller/processor 359, the cellular baseband processor 1124, and/or the application processor 1106.

At 802, the UE may receive an allocation of one or more zero power slots from a network entity—the one or more zero power slots correspond to one or more transmission gaps associated with the network entity. For example, referring to FIG. 4, the UE 402 may receive, at 406, an allocation of zero power slots from the network entity 404. The reception, at 802, may be performed by the Rx frequency dependence measurement component 198 of the apparatus 1104 in FIG. 11.

At 804, the UE may detect noise energy in the one or more zero power slots corresponding to the one or more transmission gaps associated with the network entity. For example, referring to FIGS. 4-6, the UE 402 may detect, at 408, noise energy 508 based on the allocation, at 406, of the zero power slots. For example, the UE may detect the noise energy 508 at the LNA 608 in one or more zero power slots. The detection, at 804, may be performed by the Rx frequency dependence measurement component 198 of the apparatus 1104 in FIG. 11.

At 806, the UE may measure the noise energy detected in the one or more zero power slots—the measured noise energy in the one or more zero power slots corresponds to a frequency dependence of an Rx signal at the UE. For example, referring to FIG. 4, the UE 402 may measure, at 410, the noise energy in the zero power slots. A measurement of the noise energy 508 may be indicative of an Rx frequency dependence associated with the Rx signal 506. The measurement, at 806, may be performed by the Rx frequency dependence measurement component 198 of the apparatus 1104 in FIG. 11.

At 808, the UE may receive the noise energy and a Tx signal of the network entity in one or more non-zero power slots. For example, referring to FIG. 4, the UE 402 may receive, at 412a, a Tx signal in a non-zero slot from the network entity 404 in addition to receiving the noise energy, at 412b. The reception, at 808, may be performed by the Rx frequency dependence measurement component 198 of the apparatus 1104 in FIG. 11.

At 810, the UE may measure the noise energy with the Tx signal of the network entity in the one or more non-zero power slots-a second measurement of the noise energy and the Tx signal of the network entity is indicative of a combined frequency dependence of the Tx signal and the Rx signal. For example, referring to FIG. 4, the UE 402 may measure, at 414, the noise energy and the Tx signal in non-zero power slots. The measurement, at 810, may be performed by the Rx frequency dependence measurement component 198 of the apparatus 1104 in FIG. 11.

At 812, the UE may report the measurement indicative of the frequency dependence of the Rx signal and the second measurement indicative of the combined frequency dependence of the Tx signal and the Rx signal to the network entity. For example, referring to FIG. 4, the UE 402 may transmit, at 416, a UE report to the network entity 404. The UE report may be indicative of the Rx frequency dependence and a total frequency dependence of the combined signal. The transmission, at 812, may be performed by the Rx frequency dependence measurement component 198 of the apparatus 1104 in FIG. 11.

Figure 9:
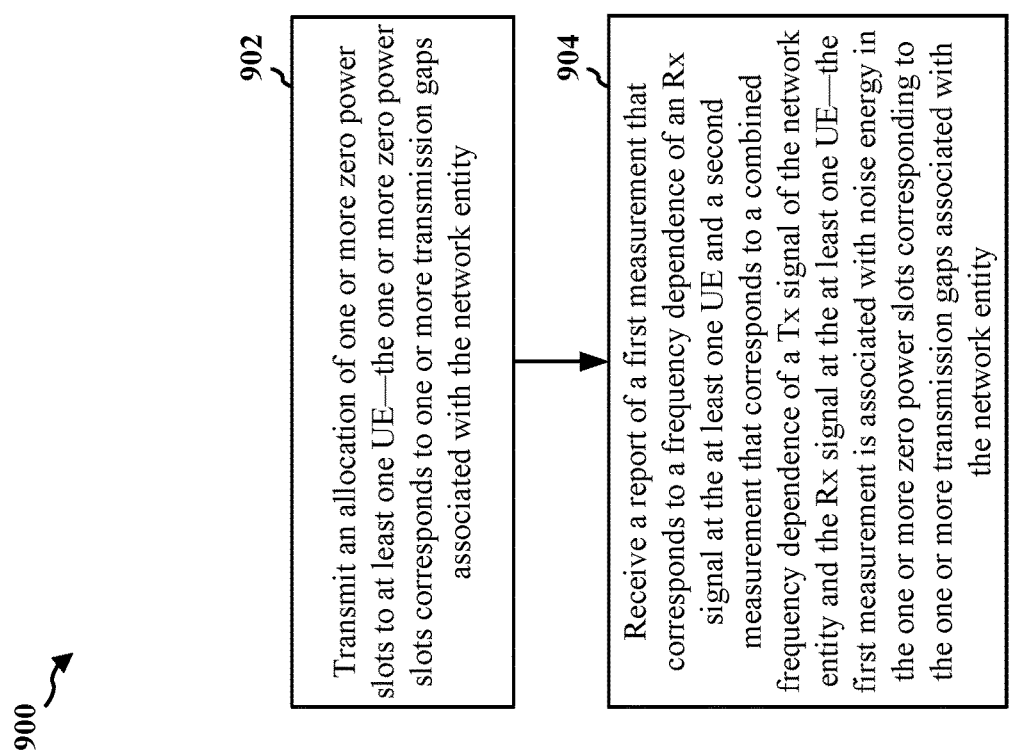
FIG. 9 is a flowchart of a method of wireless communication at a network entity.

FIG. 9 is a flowchart 900 of a method of wireless communication. The method may be performed by a network entity or a base station (e.g., the network entity 404, 1102, 1202, the base station 102, 310, the CU 110, the DU 130, the RU 140, etc.), which may include the memory 376 and which may correspond to the entire network entity 404, 1102, 1202 or base station 102, 310, or a component of the network entity 404, 1202 or the base station 102, 310, such as the CU 110, the DU 130, the RU 140, the TX processor 316, the RX processor 370, and/or the controller/processor 375.

At 902, the network entity or the base station may transmit an allocation of one or more zero power slots to at least one UE—the one or more zero power slots corresponds to one or more transmission gaps associated with the network entity. For example, referring to FIG. 4, the network entity 404 may transmit, at 406, an allocation of zero power slots to the UE 402. The transmission, at 902, may be performed by the zero power slot allocation component 199 of the network entity 1202 in FIG. 12.

At 904, the network entity or the base station may receive a report of a first measurement that corresponds to a frequency dependence of an Rx signal at the at least one UE and a second measurement that corresponds to a combined frequency dependence of a Tx signal of the network entity and the Rx signal at the at least one UE—the first measurement is associated with noise energy in the one or more zero power slots corresponding to the one or more transmission gaps associated with the network entity. For example, referring to FIG. 4, the network entity 404 may receive, at 416, a UE report from the UE 402. The UE report may be indicative of the Rx frequency dependence and a total frequency dependence of the combined signal. The reception, at 904, may be performed by the zero power slot allocation component 199 of the network entity 1202 in FIG. 12.

Figure 10:
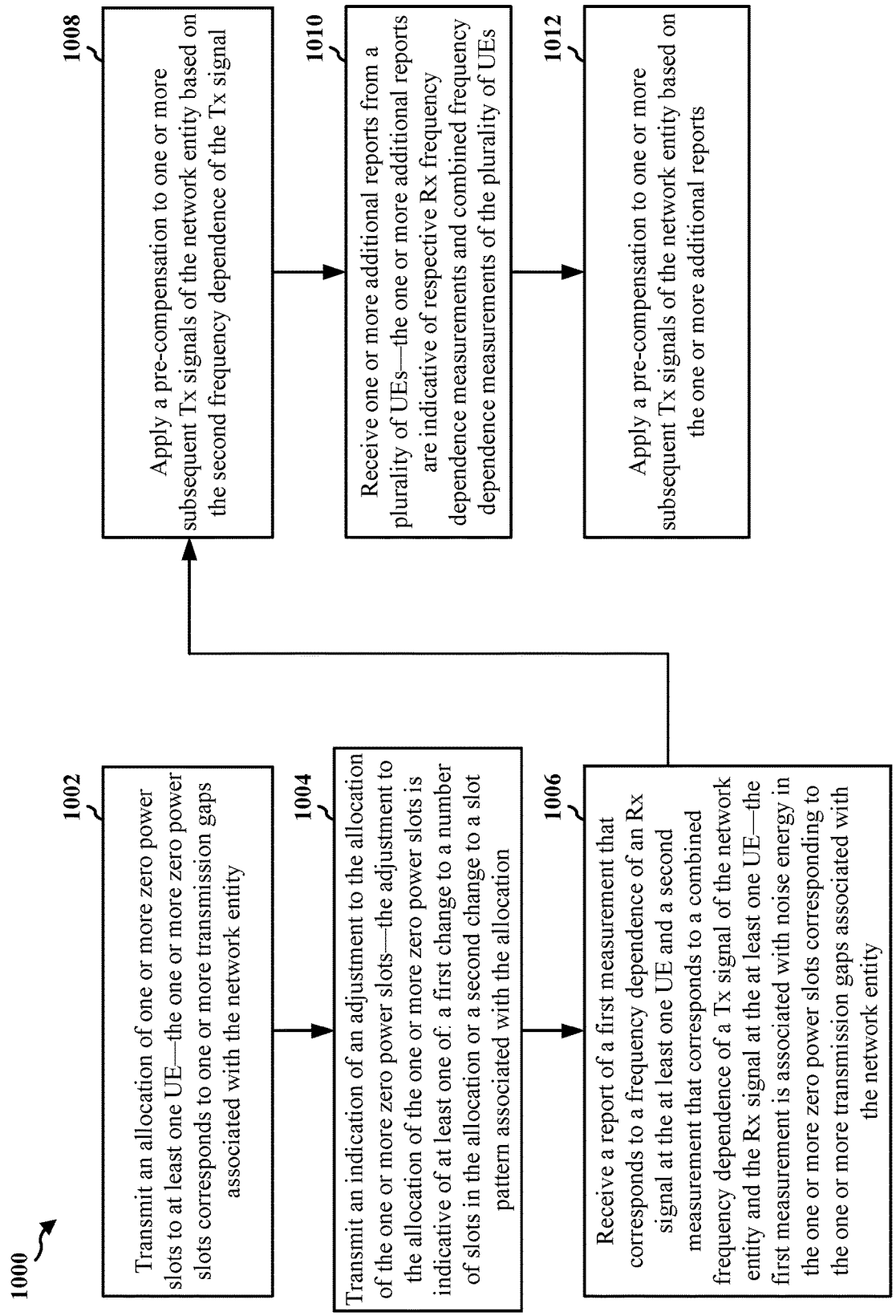
FIG. 10 is a flowchart of a method of wireless communication at a network entity.

FIG. 10 is a flowchart 1000 of a method of wireless communication. The method may be performed by a network entity or a base station (e.g., the network entity 404, 1102, 1202, the base station 102, 310, the CU 110, the DU 130, the RU 140, etc.), which may include the memory 376 and which may correspond to the entire network entity 404, 1102, 1202 or base station 102, 310, or a component of the network entity 404, 1202 or the base station 102, 310, such as the CU 110, the DU 130, the RU 140, the TX processor 316, the RX processor 370, and/or the controller/processor 375.

At 1002, the network entity or the base station may transmit an allocation of one or more zero power slots to at least one UE—the one or more zero power slots corresponds to one or more transmission gaps associated with the network entity. For example, referring to FIG. 4, the network entity 404 may transmit, at 406, an allocation of zero power slots to the UE 402. The transmission, at 1002, may be performed by the zero power slot allocation component 199 of the network entity 1202 in FIG. 12.

At 1004, the network entity or the base station may transmit an indication of an adjustment to the allocation of the one or more zero power slots—the adjustment to the allocation of the one or more zero power slots is indicative of at least one of: a first change to a number of slots in the allocation or a second change to a slot pattern associated with the allocation. For example, referring to FIG. 4, the transmission, at 406, by the network entity 404 may correspond to an adjustment/update to the allocation of the zero power slots. The transmission, at 1004, may be performed by the zero power slot allocation component 199 of the network entity 1202 in FIG. 12.

At 1006, the network entity or the base station may receive a report of a first measurement that corresponds to a frequency dependence of an Rx signal at the at least one UE and a second measurement that corresponds to a combined frequency dependence of a Tx signal of the network entity and the Rx signal at the at least one UE—the first measurement is associated with noise energy in the one or more zero power slots corresponding to the one or more transmission gaps associated with the network entity. For example, referring to FIG. 4, the network entity 404 may receive, at 416, a UE report from the UE 402. The UE report may be indicative of the Rx frequency dependence and a total frequency dependence of the combined signal. The reception, at 1006, may be performed by the zero power slot allocation component 199 of the network entity 1202 in FIG. 12.

At 1008, the network entity or the base station may apply a pre-compensation to one or more subsequent Tx signals of the network entity based on the second frequency dependence of the Tx signal. For example, referring to FIG. 4, the network entity 404 may apply, at 418, a pre-compensation to further Tx signaling based on the UE report (e.g., indicative of the Rx frequency dependence and the total frequency dependence) received, at 416, from the UE 402. The application, at 1008, may be performed by the zero power slot allocation component 199 of the network entity 1202 in FIG. 12.

At 1010, the network entity or the base station may receive one or more additional reports from a plurality of UEs—the one or more additional reports are indicative of respective Rx frequency dependence measurements and combined frequency dependence measurements of the plurality of UEs. For example, referring to FIG. 4, the network entity 404 may receive, at 420, additional UE report(s) from one or more different UEs than the UE 402. The reception, at 1010, may be performed by the zero power slot allocation component 199 of the network entity 1202 in FIG. 12.

At 1012, the network entity or the base station may apply a pre-compensation to one or more subsequent Tx signals of the network entity based on the one or more additional reports. For example, referring to FIG. 4, the network entity 404 may apply, at 422, a pre-compensation to further Tx signaling based on the additional UE report(s) received, at 420, from the one or more different UEs than the UE 402. The application, at 1012, may be performed by the zero power slot allocation component 199 of the network entity 1202 in FIG. 12.

Figure 11:
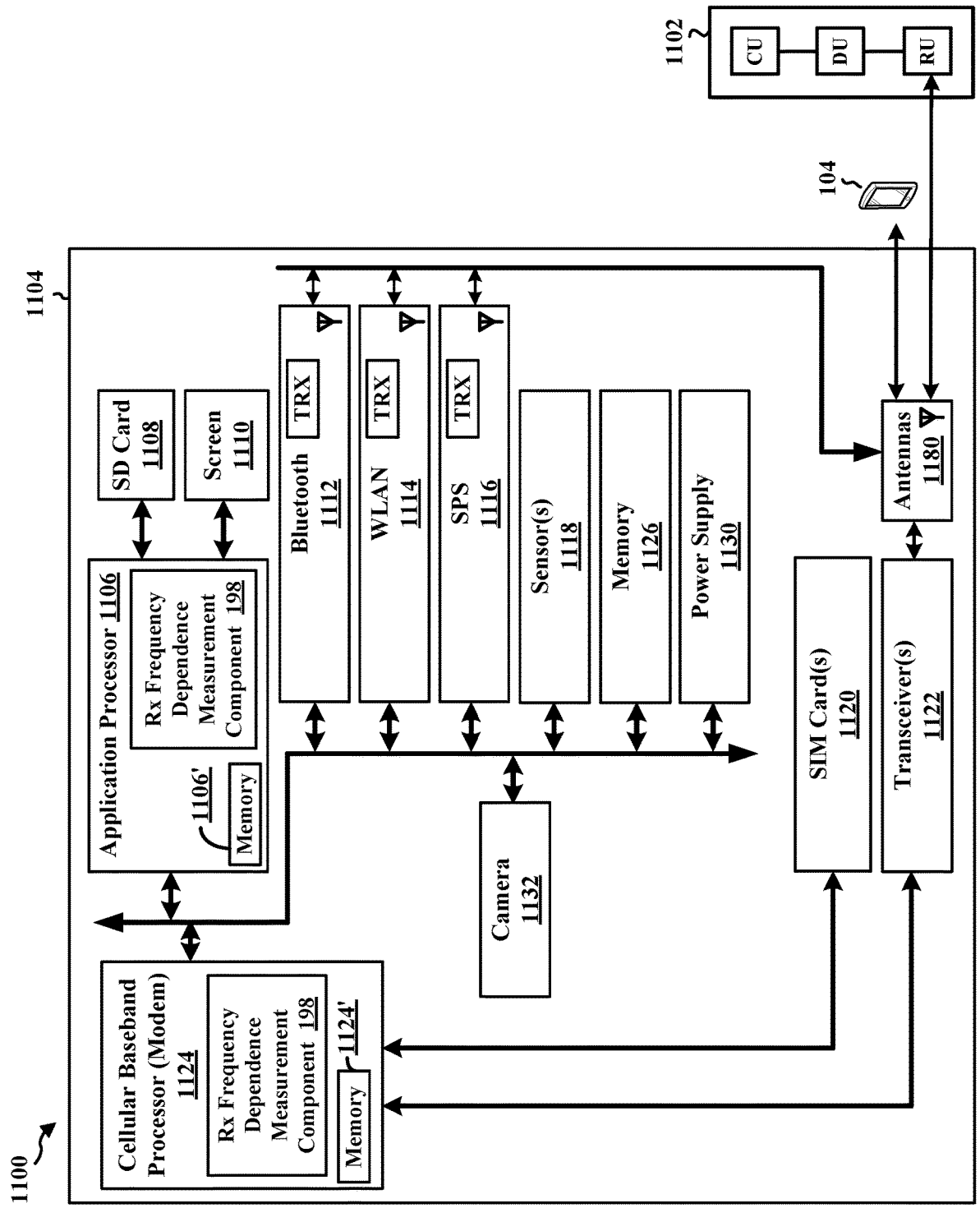
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional modules of memory 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional modules of memory 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the Rx frequency dependence measurement component 198 is configured to receive an allocation of one or more ZP slots from a network entity, the one or more ZP slots corresponding to one or more transmission gaps associated with the network entity; detect noise energy in the one or more ZP slots corresponding to the one or more transmission gaps associated with the network entity; and measure the noise energy detected in the one or more ZP slots, the measured noise energy in the one or more ZP slots corresponding to a frequency dependence of an Rx signal at the UE. The Rx frequency dependence measurement component 198 may be within the cellular baseband processor 1124, the application processor 1106, or both the cellular baseband processor 1124 and the application processor 1106. The Rx frequency dependence measurement component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1104 may include a variety of components configured for various functions. In one configuration, the apparatus 1104, and in particular the cellular baseband processor 1124 and/or the application processor 1106, includes means for receiving an allocation of one or more ZP slots from a network entity, the one or more ZP slots corresponding to one or more transmission gaps associated with the network entity; means for detecting noise energy in the one or more ZP slots corresponding to the one or more transmission gaps associated with the network entity; and means for measuring the noise energy received in the one or more ZP slots, the measured noise energy in the one or more ZP slots corresponds to a frequency dependence of an Rx signal at the UE. The means for measuring the noise energy detected in the one or more ZP slots is further configured to average a total noise energy detected across the one or more ZP slots. The apparatus 1104 further includes means for receiving an indication of an adjustment to the allocation of the one or more ZP slots, where the adjustment to the allocation of the one or more ZP slots is indicative of at least one of: a first change to a number of slots in the allocation or a second change to a slot pattern associated with the allocation. The apparatus 1104 further includes means for detecting the noise energy and a Tx signal of the network entity in one or more non-zero power (NZP) slots; means for measuring the noise energy with the Tx signal of the network entity in the one or more NZP slots, where a second measurement of the noise energy and the Tx signal of the network entity corresponds to a combined frequency dependence of the Tx signal and the Rx signal; and means for reporting the measurement that corresponds to the frequency dependence of the Rx signal and the second measurement that corresponds to the combined frequency dependence of the Tx signal and the Rx signal to the network entity.

The means may be the Rx frequency dependence measurement component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
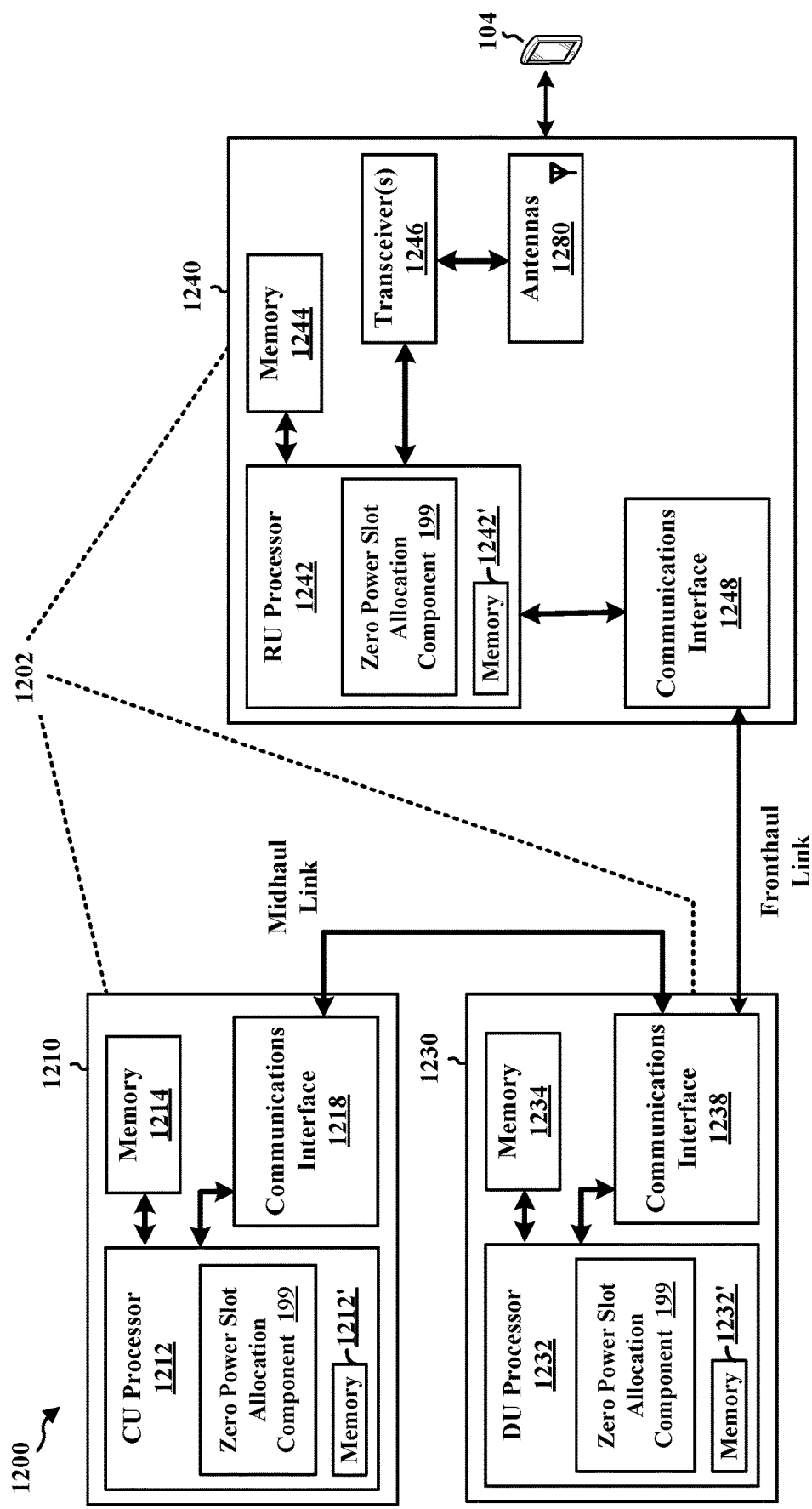
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the zero power slot allocation component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the zero power slot allocation component 199 is configured to transmit an allocation of one or more ZP slots to at least one UE, the one or more ZP slots corresponding to one or more transmission gaps associated with the network entity; and receive a report of a first measurement indicative of a frequency dependence of an Rx signal at the at least one UE and a second measurement indicative of a combined frequency dependence of a Tx signal of the network entity and the Rx signal at the at least one UE, the first measurement associated with noise energy in the one or more ZP slots corresponding to the one or more transmission gaps associated with the network entity. The zero power slot allocation component 199 may be within one or more processors of one or more of the CU 1210, DU 1230, and the RU 1240. The zero power slot allocation component 199 may be one or more hardware components specifically configured to carry out the stated processes/algorithm, implemented by one or more processors configured to perform the stated processes/algorithm, stored within a computer-readable medium for implementation by one or more processors, or some combination thereof.

The network entity 1202 may include a variety of components configured for various functions. In one configuration, the network entity 1202 includes means for transmitting an allocation of one or more ZP slots to at least one UE, the one or more ZP slots corresponding to one or more transmission gaps associated with the network entity; and means for receiving a report of a first measurement that corresponds to a frequency dependence of an Rx signal at the at least one UE and a second measurement that corresponds to a combined frequency dependence of a Tx signal of the network entity and the Rx signal at the at least one UE, the first measurement associated with noise energy in the one or more ZP slots corresponding to the one or more transmission gaps associated with the network entity. The network entity 1202 further includes means for transmitting an indication of an adjustment to the allocation of the one or more ZP slots, where the adjustment to the allocation of the one or more ZP slots is indicative of at least one of: a first change to a number of slots in the allocation or a second change to a slot pattern associated with the allocation. The network entity 1202 further includes means for applying a pre-compensation to one or more subsequent Tx signals of the network entity based on the second frequency dependence of the Tx signal. The network entity 1202 further includes means for receiving one or more additional reports from the plurality of UEs, the one or more additional reports indicative of respective Rx frequency dependence measurements and combined frequency dependence measurements of the plurality of UEs. The network entity 1202 further includes means for applying a pre-compensation to one or more subsequent Tx signals of the network entity based on the one or more additional reports.

The means may be the zero power slot allocation component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving an allocation of one or more ZP slots from a network entity, the one or more ZP slots corresponding to one or more transmission gaps associated with the network entity; detecting noise energy in the one or more ZP slots corresponding to the one or more transmission gaps associated with the network entity; and measuring the noise energy detected in the one or more ZP slots, the measured noise energy in the one or more ZP slots corresponding to a frequency dependence of an Rx signal at the UE.

Aspect 2 may be combined with aspect 1 and includes that the allocation of the one or more ZP slots is a network-wide allocation of the one or more ZP slots.

Aspect 3 may be combined with any of aspects 1-2 and includes that measuring the noise energy detected in the one or more ZP slots further includes averaging a total noise energy detected across the one or more ZP slots.

Aspect 4 may be combined with any of aspects 1-3 and includes that the noise energy detected in the one or more ZP slots is based on at least one of: one or more power gains associated with the one or more ZP slots or one or more Rx beams associated with the one or more ZP slots.

Aspect 5 may be combined with any of aspects 1-4 and includes that the allocation of the one or more ZP slots corresponds to a periodic allocation, an aperiodic allocation, or a semi-persistent allocation.

Aspect 6 may be combined with any of aspects 1-5 and further includes receiving an indication of an adjustment to the allocation of the one or more ZP slots, where the adjustment to the allocation of the one or more ZP slots is indicative of at least one of: a first change to a number of slots in the allocation or a second change to a slot pattern associated with the allocation.

Aspect 7 may be combined with any of aspects 1-6 and includes that the one or more ZP slots correspond to a plurality of ZP slots including at least one non-contiguous ZP slot.

Aspect 8 may be combined with any of aspects 1-7 and further includes detecting the noise energy and a Tx signal of the network entity in one or more NZP slots; measuring the noise energy with the Tx signal of the network entity in the one or more NZP slots, where a second measurement of the noise energy and the Tx signal of the network entity corresponds to a combined frequency dependence of the Tx signal and the Rx signal; and reporting the measured noise energy that corresponds to the frequency dependence of the Rx signal and the second measurement that corresponds to the combined frequency dependence of the Tx signal and the Rx signal to the network entity.

Aspect 9 may be combined with any of aspects 1-8 and includes that a difference between the combined frequency dependence of the Tx signal and the Rx signal and the frequency dependence of the Rx signal corresponds to a second frequency dependence of the Tx signal.

Aspect 10 may be combined with any of aspects 1-9 and includes that the second frequency dependence of the Tx signal corresponds to a pre-compensation to one or more subsequent Tx signals received from the network entity.

Aspect 11 may be combined with any of aspects 1-10 and includes that the frequency dependence of the Rx signal is based on an Rx chain being amplified to a highest level of an amplifier.

Aspect 12 is a method of wireless communication at a network entity, including: transmitting an allocation of one or more ZP slots to at least one UE, the one or more ZP slots corresponding to one or more transmission gaps associated with the network entity; and receiving a report of a first measurement that corresponds to a frequency dependence of an Rx signal at the at least one UE and a second measurement that corresponds to a combined frequency dependence of a Tx signal of the network entity and the Rx signal at the at least one UE, the first measurement associated with noise energy in the one or more ZP slots corresponding to the one or more transmission gaps associated with the network entity.

Aspect 13 may be combined with aspect 12 and includes that the allocation of the one or more ZP slots is a network-wide allocation of the one or more ZP slots.

Aspect 14 may be combined with any of aspects 12-13 and includes that the first measurement associated with the noise energy in the one or more ZP slots corresponds to an average of a total noise energy in the one or more ZP slots.

Aspect 15 may be combined with any of aspects 12-14 and includes that the allocation of the one or more ZP slots corresponds to a periodic allocation, an aperiodic allocation, or a semi-persistent allocation.

Aspect 16 may be combined with any of aspects 12-15 and further includes transmitting an indication of an adjustment to the allocation of the one or more ZP slots, where the adjustment to the allocation of the one or more ZP slots is indicative of at least one of: a first change to a number of slots in the allocation or a second change to a slot pattern associated with the allocation.

Aspect 17 may be combined with any of aspects 12-16 and includes that the one or more ZP slots correspond to a plurality of ZP slots including at least one non-contiguous ZP slot.

Aspect 18 may be combined with any of aspects 12-17 and includes that a difference between the combined frequency dependence of the Tx signal and the Rx signal and the frequency dependence of the Rx signal corresponds to a second frequency dependence of the Tx signal.

Aspect 19 may be combined with any of aspects 12-18 and further includes applying a pre-compensation to one or more subsequent Tx signals of the network entity based on the second frequency dependence of the Tx signal.

Aspect 20 may be combined with any of aspects 12-19 and includes that the at least one UE corresponds to a plurality of UEs, the method further including receiving one or more additional reports from the plurality of UEs, the one or more additional reports indicative of respective Rx frequency dependence measurements and combined frequency dependence measurements of the plurality of UEs.

Aspect 21 may be combined with any of aspects 12-20 and further includes applying a pre-compensation to one or more subsequent Tx signals of the network entity based on the one or more additional reports.

Aspect 22 may be combined with any of aspects 12-21 and includes that the frequency dependence of the Rx signal is based on an Rx chain being amplified to a highest level of an amplifier.

Aspect 23 is an apparatus for wireless communication for implementing a method as in any of aspects 1-22.

Aspect 24 is an apparatus for wireless communication including means for implementing a method as in any of aspects 1-22.

Aspect 25 may be combined with any of aspects 23-24 and further includes at least one of a transceiver, an antenna, or an amplifier coupled to at least one processor of the apparatus.

Aspect 26 is a non-transitory computer-readable medium storing computer executable code, the code when executed by at least one processor causes the at least one processor to implement a method as in any of aspects 1-22.

What is claimed is:

1. An apparatus for wireless communication at a user equipment (UE), comprising:
   memory; and
   at least one processor coupled to the memory and, based at least in part on information stored in the memory, the at least one processor is configured to:
   receive an allocation of one or more zero power (ZP) slots from a network entity, the one or more ZP slots corresponding to one or more transmission gaps associated with the network entity;
   receive an indication of an adjustment to the allocation of the one or more ZP slots, wherein the adjustment to the allocation of the one or more ZP slots is indicative of at least one of: a first change to a number of slots in the allocation or a second change to a slot pattern associated with the allocation;
   detect noise energy in the one or more ZP slots corresponding to the one or more transmission gaps associated with the network entity; and
   measure the noise energy detected in the one or more ZP slots, wherein the measured noise energy in the one or more ZP slots corresponds to a frequency dependence of a receive (Rx) signal at the UE.

2. The apparatus of claim 1, wherein the allocation of the one or more ZP slots is a network-wide allocation of the one or more ZP slots.

3. The apparatus of claim 1, wherein measuring the noise energy detected in the one or more ZP slots comprises averaging a total noise energy detected across the one or more ZP slots.

4. The apparatus of claim 1, wherein the noise energy detected in the one or more ZP slots is based on at least one of: one or more power gains associated with the one or more ZP slots or one or more Rx beams associated with the one or more ZP slots.

5. The apparatus of claim 1, wherein the allocation of the one or more ZP slots corresponds to a periodic allocation, an aperiodic allocation, or a semi-persistent allocation.

6. The apparatus of claim 1, wherein the one or more ZP slots correspond to a plurality of ZP slots including at least one non-contiguous ZP slot.

7. The apparatus of claim 1, wherein the at least one processor is further configured to:
   detect the noise energy and a transmit (Tx) signal of the network entity in one or more non-zero power (NZP) slots;
   measure the noise energy with the Tx signal of the network entity in the one or more NZP slots, wherein a second measurement of the noise energy and the Tx signal of the network entity corresponds to a combined frequency dependence of the Tx signal and the Rx signal; and
   report the measured noise energy that corresponds to the frequency dependence of the Rx signal and the second measurement that corresponds to the combined frequency dependence of the Tx signal and the Rx signal to the network entity.

8. The apparatus of claim 7, wherein a difference between the combined frequency dependence of the Tx signal and the Rx signal and the frequency dependence of the Rx signal corresponds to a second frequency dependence of the Tx signal.

9. The apparatus of claim 8, wherein the second frequency dependence of the Tx signal corresponds to a pre-compensation to one or more subsequent Tx signals received from the network entity.

10. The apparatus of claim 1, further comprising at least one of a transceiver, an antenna, or an amplifier coupled to the at least one processor, wherein the frequency dependence of the Rx signal is based on an Rx chain being amplified to a highest level of the amplifier.

11. An apparatus for wireless communication at a network entity, comprising:
    memory; and
    at least one processor coupled to the memory and, based at least in part on information stored in the memory, the at least one processor is configured to:
    transmit an allocation of one or more zero power (ZP) slots to at least one user equipment (UE), the one or more ZP slots corresponding to one or more transmission gaps associated with the network entity;
    transmit an indication of an adjustment to the allocation of the one or more ZP slots, wherein the adjustment to the allocation of the one or more ZP slots is indicative of at least one of: a first change to a number of slots in the allocation or a second change to a slot pattern associated with the allocation; and
    receive a report of a first measurement that corresponds to a frequency dependence of a receive (Rx) signal at the at least one UE and a second measurement that corresponds to a combined frequency dependence of a transmit (Tx) signal of the network entity and the Rx signal at the at least one UE, the first measurement associated with noise energy in the one or more ZP slots corresponding to the one or more transmission gaps associated with the network entity.

12. The apparatus of claim 11, wherein the allocation of the one or more ZP slots is a network-wide allocation of the one or more ZP slots.

13. The apparatus of claim 11, wherein the first measurement associated with the noise energy in the one or more ZP slots corresponds to an average of a total noise energy in the one or more ZP slots.

14. The apparatus of claim 11, wherein the allocation of the one or more ZP slots corresponds to a periodic allocation, an aperiodic allocation, or a semi-persistent allocation.

15. The apparatus of claim 11, wherein the one or more ZP slots correspond to a plurality of ZP slots including at least one non-contiguous ZP slot.

16. The apparatus of claim 11, wherein a difference between the combined frequency dependence of the Tx signal and the Rx signal and the frequency dependence of the Rx signal corresponds to a second frequency dependence of the Tx signal.

17. The apparatus of claim 16, wherein the at least one processor is further configured to apply a pre-compensation to one or more subsequent Tx signals of the network entity based on the second frequency dependence of the Tx signal.

18. The apparatus of claim 11, wherein the at least one UE corresponds to a plurality of UEs and the at least one processor is further configured to receive one or more additional reports from the plurality of UEs, the one or more additional reports indicative of respective Rx frequency dependence measurements and combined frequency dependence measurements of the plurality of UEs.

19. The apparatus of claim 18, wherein the at least one processor is further configured to apply a pre-compensation to one or more subsequent Tx signals of the network entity based on the one or more additional reports.

20. The apparatus of claim 11, further comprising at least one of a transceiver, an antenna, or an amplifier coupled to the at least one processor, wherein the frequency dependence of the Rx signal is based on an Rx chain being amplified to a highest level of the amplifier.

21. A method of wireless communication at a user equipment (UE), comprising:
- receiving an allocation of one or more zero power (ZP) slots from a network entity, the one or more ZP slots corresponding to one or more transmission gaps associated with the network entity;
- receiving an indication of an adjustment to the allocation of the one or more ZP slots, wherein the adjustment to the allocation of the one or more ZP slots is indicative of at least one of: a first change to a number of slots in the allocation or a second change to a slot pattern associated with the allocation;
- detecting noise energy in the one or more ZP slots corresponding to the one or more transmission gaps associated with the network entity; and
- measuring the noise energy detected in the one or more ZP slots, wherein the measured noise energy in the one or more ZP slots corresponds to a frequency dependence of a receive (Rx) signal at the UE.

22. The method of claim 21, wherein the allocation of the one or more ZP slots is a network-wide allocation of the one or more ZP slots.

23. The method of claim 21, wherein measuring the noise energy detected in the one or more ZP slots comprises averaging a total noise energy detected across the one or more ZP slots.

24. The method of claim 21, wherein the noise energy detected in the one or more ZP slots is based on at least one of: one or more power gains associated with the one or more ZP slots or one or more Rx beams associated with the one or more ZP slots.

25. The method of claim 21, wherein the allocation of the one or more ZP slots corresponds to a periodic allocation, an aperiodic allocation, or a semi-persistent allocation.

26. The method of claim 21, wherein the one or more ZP slots correspond to a plurality of ZP slots including at least one non-contiguous ZP slot.

27. A method of wireless communication at a network entity, comprising:
- transmitting an allocation of one or more zero power (ZP) slots to at least one user equipment (UE), the one or more ZP slots corresponding to one or more transmission gaps associated with the network entity;
- transmitting an indication of an adjustment to the allocation of the one or more ZP slots, wherein the adjustment to the allocation of the one or more ZP slots is indicative of at least one of: a first change to a number of slots in the allocation or a second change to a slot pattern associated with the allocation; and
- receiving a report of a first measurement that corresponds to a frequency dependence of a receive (Rx) signal at the at least one UE and a second measurement that corresponds to a combined frequency dependence of a transmit (Tx) signal of the network entity and the Rx signal at the at least one UE, the first measurement associated with noise energy in the one or more ZP slots corresponding to the one or more transmission gaps associated with the network entity.

\* \* \* \* \*